United States Patent [19]
Fredrick et al.

[11] Patent Number: 5,866,235
[45] Date of Patent: Feb. 2, 1999

[54] ALL SYNTHETIC FIBER INTERIOR TRIM SUBSTRATE

[75] Inventors: John Fredrick, Davisburg; Harold H. Zaima, Auburn Hills, both of Mich.

[73] Assignee: Eften, Inc., Auburn Hills, Mich.

[21] Appl. No.: 804,201

[22] Filed: Feb. 21, 1997

[51] Int. Cl.[6] ................ B32B 3/28; B29C 47/00
[52] U.S. Cl. .......... 428/182; 156/242; 156/245; 264/257
[58] Field of Search ................ 428/150, 182, 428/174, 178, 198; 264/103, 119, 177.1, 257, 321, 241; 296/210, 214, 901, 146.7; 156/62.2, 244.25, 242, 245

[56] References Cited

U.S. PATENT DOCUMENTS

| | | | |
|---|---|---|---|
| 5,134,014 | 7/1992 | Zaima et al. | 428/186 |
| 5,660,908 | 8/1997 | Kelman et al. | 428/182 |

*Primary Examiner*—Donald Loney
*Attorney, Agent, or Firm*—Notaro & Michalos P.C.

[57] ABSTRACT

An interior trim substrate and method of making same uses a corrugated synthetic fiber liner having upper and lower sides. An upper synthetic fiber liner is bonded to the upper side of the corrugated liners and a lower synthetic fiber liner is bonded to the lower side of the corrugated synthetic fiber liner. In this way, an all synthetic fiber headliner substrate which is or can be made 100% recyclable, is formed.

4 Claims, 2 Drawing Sheets

ALL SYNTHETIC FIBER INTERIOR TRIM SUBSTRATE

FIELD AND BACKGROUND OF THE INVENTION

The present invention relates, in general, to substrates used for interior trim and especially to headliner substrates for motor vehicles, and in particular, to a new and useful headliner substrate and process for making the same, where the entire article of manufacture is made of synthetic fibers such as, but not limited to polyester (PET), polypropylene (PP), and nylon that enables it to be 100% recyclable or can be made 100% recyclable.

U.S. Pat. No. 5,022,943 and 5,134,014, and U.S. patent application Ser. No. 08/755,283 filed Nov. 22, 1996, which are all incorporated here by reference, disclose methods, structures and materials for composite substrates of the type to which the present application relates.

Substrates for interior trim are known to be manufactured from various natural and synthetic fibers. In particular, headliners are known which are made from corrugated fiberboard and thermoplastic composites. The composite may include an upper kraft paper layer and intermediate thermoplastic film layer (e.g. polyester or polyethylene), an inner kraft liner, an inner thermoplastic layer, and a corrugated fiberboard medium.

It is also known to use fiberglass in a headliner for its strength, dimensional stability and acoustic absorption characteristics. Further, it is also known to use polyurethane foam sandwiched between two glass mats for its strength and dimensional stability of the glass mats and for acoustical enhancement of the foam. It is also known to use polyester mat sandwiched between glass mats again for its strength and dimensional stability as well as for its acoustical enhancement. Finally, attempts have been made to use only polyester mats, however, dimensional stability and structural rigidity could not be maintained without incurring exorbitant costs or without using glass mats to increase the rigidity and dimensional stability of the overall product. In today's market, there is no one product that can currently meet the stringent demands of the automotive industry, which are a low cost, lightweight interior trim substrate with superior acoustical performance and moldability while passing the dimensional stability and transverse strength requirements while also being 100% recyclable.

The main reason to develop an all synthetic fiber headliner is because it can meet all the aforementioned requirements while still providing the ability for the entire headliner to be 100% recyclable. Current attempts to develop an all synthetic fiber interior trim substrate has been supplied using a thick mat of high melt polyester fibers mixed with low melt PET fibers called binder fibers. This mat is then thermoformed in a hot molding die, then transferred to a marriage tool where a polyester non-woven cosmetic cover material is bounded to the polyester fiber substrate. Please see U.S. patent application Ser. No. 08/755,283 for details concerning these dies and tools.

In some processes, the mat is preheated with hot air blowing or radiating heat through the substrate. During the heating process, the low melt PET binder fibers soften whereby binding together the high melt PET fibers. The temperature is not high enough to soften the high melt fibers. The composite is then placed into a molding die in conjunction with the polyester cosmetic covering material and formed and bonded simultaneously. This system yields a 100% polyester headliner which is 100% recyclable. Also, due to the fibrous nature and high loft of the substrate, it performs very well as sound absorber and has excellent molding.

Currently in the automotive industry, fibrous material such as fiberglass is considered the benchmark for sound absorption. However, due to the potential undesirable characteristics of the glass fibers during the processing of the substrate as well as in the final product, the automotive industry is attempting to eliminate fiberglass type products as an interior trim substrate. Resinated cotton or shoddy and phenolic impregnated polyester fibers both have proven to be effective sound absorption substrates; however, both products use phenolic resin as a strengthening and binder agent which are considered to be undesirable due to the formaldehyde and odor this product produces as well as its non-recyclable characteristic. Synthetic fibers are seen as a major alternative to eliminate the undesirable effect of fiberglass and phenolic impregnated fibers.

Cost is the major prohibitive issue in today's all polyester interior trim substrate. Polyester fibers are very expensive compared to other substrates available on the market. Furthermore, in order to attain a substrate thickness of 15–20 mm (as required for superior sound absorption), a very thick mat must be used prior to compression, otherwise, there will not be enough pressure to bond enough binder fibers together, resulting in a headliner that will not have the integrity to pass the automotive specifications for transverse strength as well as through the environmental chambers. As a result, in order to enable the current product to pass the specification, the percentage of binder fibers which as double the cost of the matrix fibers must be increased and simultaneously the amount of mass must be increased. Although this product became a salable product that is 100% recyclable, the product is neither cost effective nor light weight. This leads to the primary reason for the present invention.

SUMMARY OF THE INVENTION

An object of the present invention is to provide a headliner substrate which is made entirely or predominantly of synthetic fibers such as polyester or polypropylene, so that the substrate can be recycled or be made recyclable. The headliner of the invention is also cost effective, lightweight and has similar advantageous characteristics of strength and acoustic absorption to its fibrous counterparts and better sound absorption characteristics as other substrates that are not made from fibrous material.

A further object of the present invention is to provide a method for manufacturing the all synthetic fiber substrate into various interior trim components such as a headliner.

Another object is to provide a 100% synthetic fiber interior trim headliner substrate that does not require a thick mat of fibers with a high percentage of the more costly binder fibers in order to pass the testing requirements of the automotive industry and to maintain low weight. If a thick mat is necessary for additionally enhanced acoustical performance, less fibers would be required compared to other synthetic fiber substrate constructions on the market. This construction will greatly reduce both cost and weight from the product.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
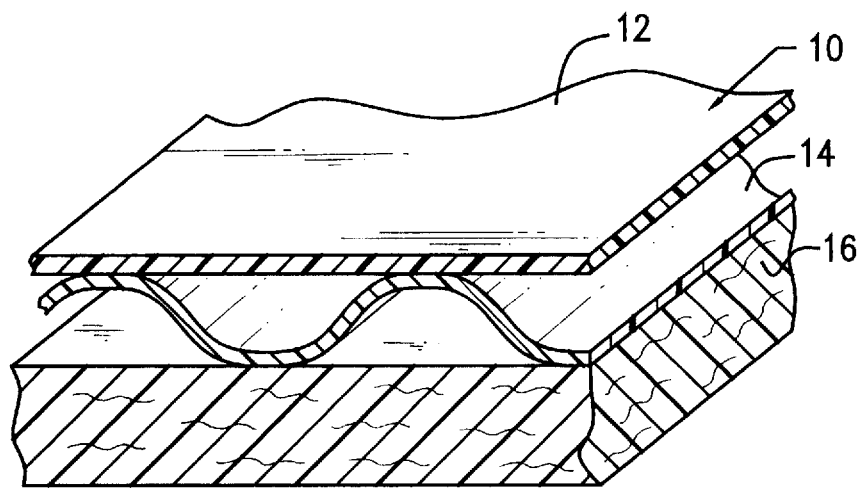
FIG. 1 is a partial, schematic, perspective view of the starting components of a headliner substrate of the present invention.

Referring to the drawings in particular, the invention embodied in FIG. 1 comprises the components that form the all synthetic fiber interior trim product substrate of the present invention.

An important feature of the invention is to corrugate a synthetic fiber liner through existing and known corrugators. Prior to molding, the substrate includes a flat synthetic fiber liner 12 bonded to a corrugated synthetic fiber liner 14. The liner 12 represents the sheet metal side of the headliner. On the car interior side of the substrate, is a synthetic fiber mat 16 comprised of a mixture of high melt synthetic fibers and low melt synthetic binder fibers.

Figure 2:
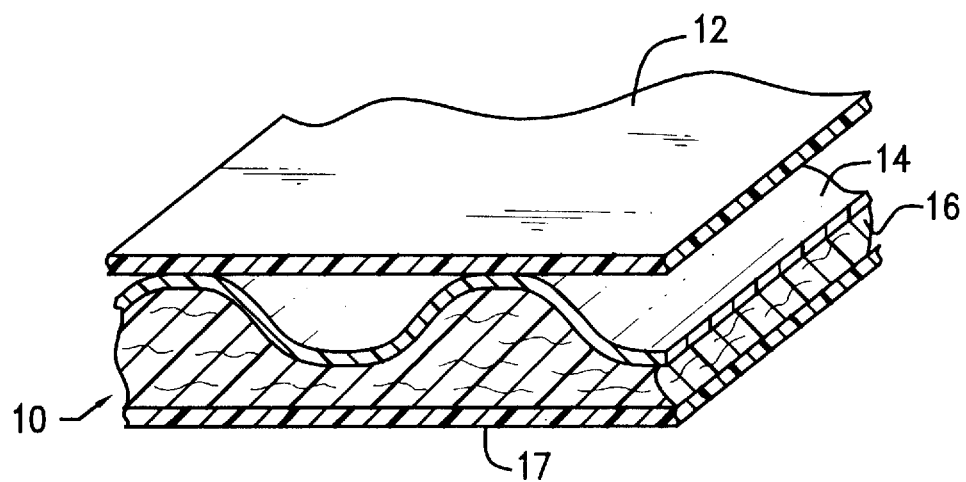
FIG. 2 is a view similar to FIG. 1, after the completed product such as a headliner, rear parcel tray or door panel has been formed.

After thermoforming, as shown in FIG. 2, the low melt fibers of the synthetic fiber mat 16 will soften and adhere to the corrugated synthetic fiber liner 14 as well as bonding the high melt fibers within the mat. The corrugated synthetic fiber liner 14 in this construction allows for the use of much less synthetic fibers due to the flexural strength created by the fluting due to its I beam effect. The synthetic fiber mat 16 can be of much lower fiber density than current technology without the corrugated I beams. This system allows the use of a thick substrate for excellent sound absorption, only on the interior side, limiting the fibers required. A cosmetic cover sheet 17, also of synthetic fiber, completes the composite. Cover sheet 17 can be adhered to mat 16 in one of the die or marriage steps.

Figure 3:
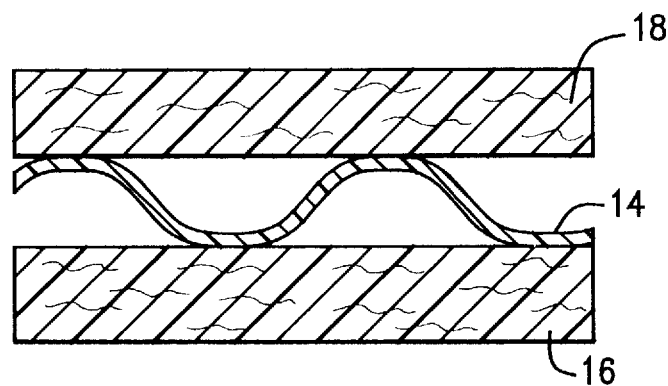
FIG. 3 is a sectional view of another embodiment of the invention during an initial arrangement of components.
Figure 4:
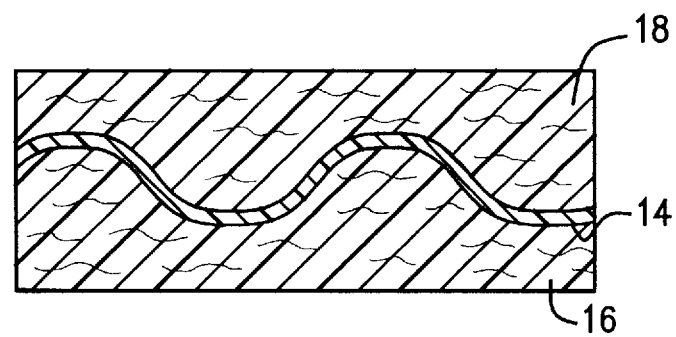
FIG. 4 is a view similar to FIG. 3 of the completed product after it has been formed.

As shown in FIGS. 3 and 4, where like numbers are used for similar elements, a synthetic fiber mat 18 can be used on both sides of the corrugated synthetic fiber liner 14. Again this allows for the use of a thick substrate for good sound absorption while reducing the total amount of fibers required.

Figure 5:
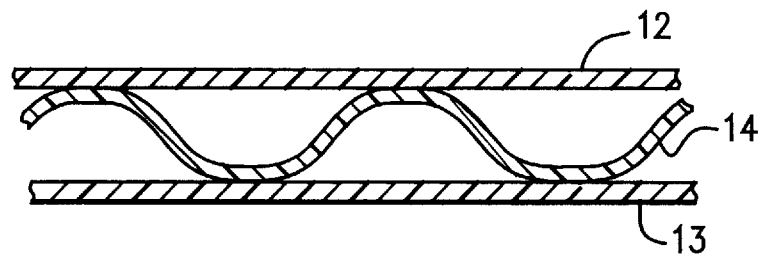
FIG. 5 is a view similar to FIG. 4, illustrating a still further embodiment of the invention.

When excellent sound absorption is not a requirement, a construction without the thick synthetic fiber mat can be used. FIG. 5 illustrates construction where synthetic fiber lines 12 and 13 can be placed on both sides of the corrugated synthetic fiber layer 14. This would be a lower cost alternative for entry level vehicles.

In many cases, synthetic fiber liners specially constructed to achieve sound attenuation by causing a pressure drop in the amplitude of sound as opposed to sound absorption through diffusion of sound can be used to greatly reduce sound without the use of highly lofted mats greatly reducing weight and cost. The construction will be similar to FIG. 5 with the use of specially formulated fiber construction. These products are commercially available and covered by U.S. Pat. No. 4,420,526.

All of these embodiments can be made 100% recyclable by using a synthetic fiber liner either spunbond or nonwoven and corresponding synthetic fiber cosmetic cover material, shown for example at 17 in FIG. 2.

The unique aspect of these constructions is with the corrugated synthetic fiber liner. Synthetic fiber weights and densities may be varied to meet the needs of every vehicle line from entry level to high end luxury vehicles. The corrugated synthetic fiber gives the construction good flexural strength while maintaining low cost and a lightweight construction by allowing the use of less synthetic fibers in the substrate. Further, excellent acoustical results can be achieved by either lofting the product to the thickness of 15–20 mm or through the use of the specially formulated synthetic fiber liners that will promote pressure drop to attenuate unwanted noise in the vehicle interior. The substrates are also fully moldable since the synthetic fibers are a thermoplastic.

By low melt synthetic binder fiber, melting at from about 100° C. to 150° C. is meant. High melt fibers melt at about 150° C. to 250° C. The proportion of high melt to low melt fibers which is contemplated for the mats 16 and 18, are about 5.0% to 45% low melt binder fibers and the remainder high melt matrix fibers. The headliner substrate is preferably in the final range of 2 mm to 20 mm with acoustic headliners being advantageously from 15–20 mm.

The prior art mats before molding are generally from 20.0 mm to 40.0 mm thick while the starting mats of the present invention can be from 4.0 to 25.0 mm thick and have reduced density. The prior art density is about 200 to 350 oz. per square feet while the mats of the present invention can have a density from about 2.5 to 250 oz. per square foot and a starting thickness from about 5.0 to 25.0 mm.

When compressed in a heated mold so that the composites of FIGS. 1 and 3 are formed into the final substrate of FIGS. 2 and 4 respectively, temperatures of about 140° C. to 200° C. are utilized and pressures of 30 to 80 tons and duration of 15 to 45 seconds. For the through air heat system the hot air heat temperature would be from 175° C. to 250° C. and the molding temperature shall be 30° C. to 80° C.

Liners 12, 13 and corrugated liner 14 are advantageously made of synthetic fiber sheet material having a thickness of about 0.3 to 2.5 mm.

While specific embodiments of the invention have been shown and described in detail to illustrate the application of the principles of the invention, it will be understood that the invention may be embodied otherwise without departing from such principles.

What is claimed is:

1. An interior trim substrate comprising:
    a corrugated synthetic fiber layer having upper and lower corrugated sides with corrugated flutes with peaks and valleys and made of a sheet of polyester or polypropylene;
    an upper synthetic fiber liner bonded to peaks of the flutes on the upper side of the corrugated synthetic fiber layer; and
    a lower synthetic fiber liner bonded to peaks of the flutes on the lower side of the corrugated synthetic fiber layer, the liners both being sheets of polyester or polypropylene and hollow spaces being left between the upper and lower corrugated sides of the layer and the liners.

2. A substrate according to claim 1 wherein the upper and lower liners comprise thin sheets of synthetic fiber liner connected to peaks of the flutes on both sides of the corrugated liner.

3. A method of making an all synthetic fiber interior trim substrate comprising:

forming a corrugated synthetic fiber layer having upper and lower corrugated sides with corrugations, the layer being made of polyester or polypropylene;

laying an upper synthetic fiber liner onto the upper side of the corrugated layer to connect with correguation peaks of the upper side of the layer to leave hollow spaces between the layer and the upper liner;

laying a lower synthetic fiber liner onto the lower side of the corrugated layer to connect with corrugation peaks of the lower side of the layer to leave hollow spaces between the layer and the lower liner; and thermoforming the liners to attach the upper and lower lines to the corrugated layer, the lines both being made of polyester or polypropylene.

4. A method according to claim 3 wherein the upper and lower liners comprise thin sheets of synthetic fiber liner connected by the thermoforming to peaks of the corrugations on opposite sides of the corrugated layer.

* * * * *